United States Patent [19]

Clowater et al.

[11] Patent Number: 5,563,340

[45] Date of Patent: Oct. 8, 1996

[54] MASS AIR FLOW SENSOR HOUSING

[75] Inventors: Lorna J. Clowater, Canton; Lawrence A. Zurek, Warren, both of Mich.

[73] Assignee: Ford Motor Company, Dearborn, Mich.

[21] Appl. No.: 412,492

[22] Filed: Mar. 28, 1995

[51] Int. Cl.⁶ ............................. G01F 1/68; G01F 5/00
[52] U.S. Cl. ........................... 73/202.5; 73/118.2
[58] Field of Search ................ 73/118.2, 202.5, 73/202

[56] References Cited

U.S. PATENT DOCUMENTS

| | | | |
|---|---|---|---|
| 4,393,697 | 7/1983 | Sato et al. | 73/118.2 |
| 4,428,231 | 1/1984 | Peloza | 73/202.5 |
| 4,517,837 | 5/1985 | Oyama et al. | 73/202.5 |
| 4,709,581 | 12/1987 | Nishimura et al. | 73/202 |
| 4,879,898 | 11/1989 | Bamer | 73/202.5 |
| 4,974,445 | 12/1990 | Arai et al. | 73/118.2 |
| 4,991,560 | 2/1991 | Arai et al. | 73/118.2 |
| 5,355,726 | 10/1994 | Zurek et al. | 73/202.5 |
| 5,467,648 | 11/1995 | Igarashi et al. | 73/202.5 |

Primary Examiner—Richard Chilcot
Assistant Examiner—Harshad Patel
Attorney, Agent, or Firm—Peter Abolins

[57] ABSTRACT

A mass air flow sensor housing for reducing backflow includes a U-shaped air flow path having an elliptical inlet and an outlet. A mass air flow sensor is positioned in the U-shaped air flow path. A converging ellipse inlet to the U-shaped air flow path reduces turbulent air flow. A deflecting wedge positioned upstream of the outlet creates a low pressure area adjacent the outlet for promoting air flow through the U-shaped bypass.

6 Claims, 2 Drawing Sheets

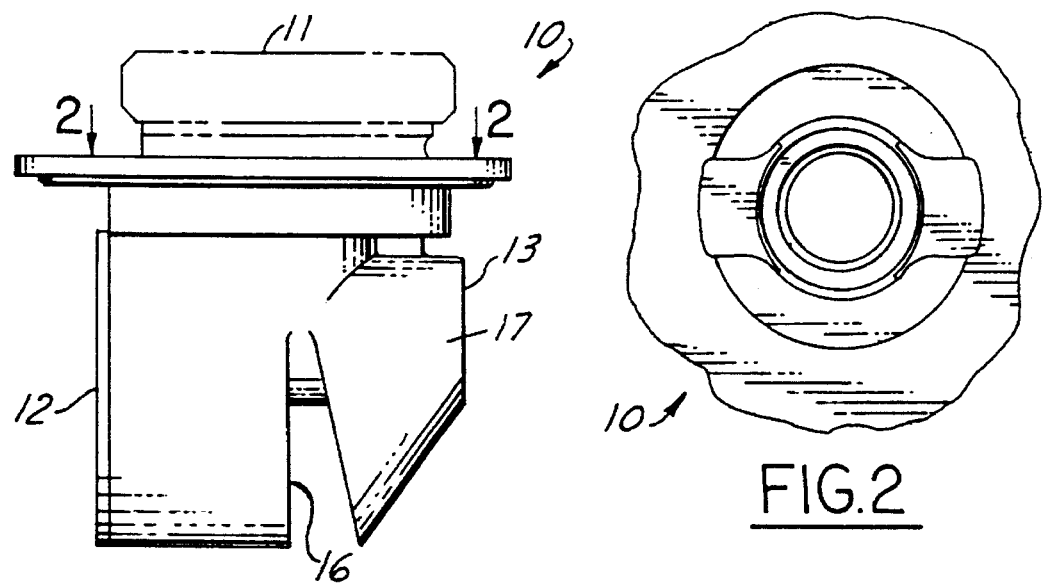
FIG.1
FIG.2
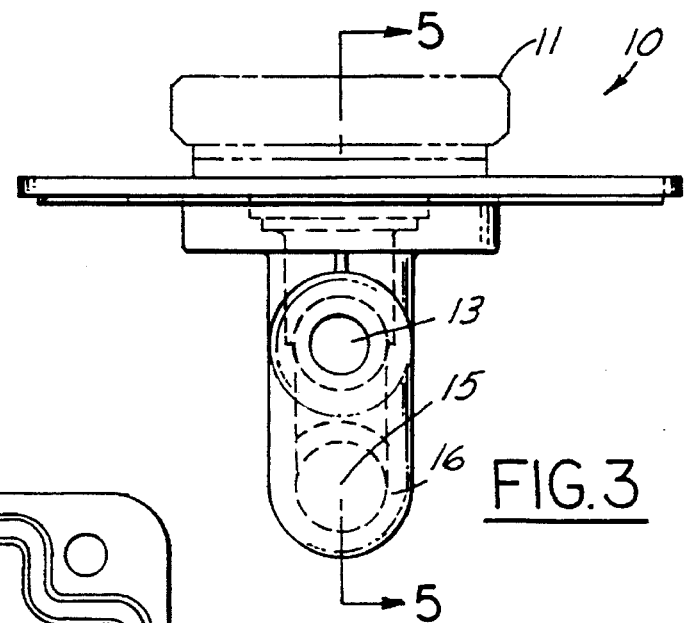
FIG.3
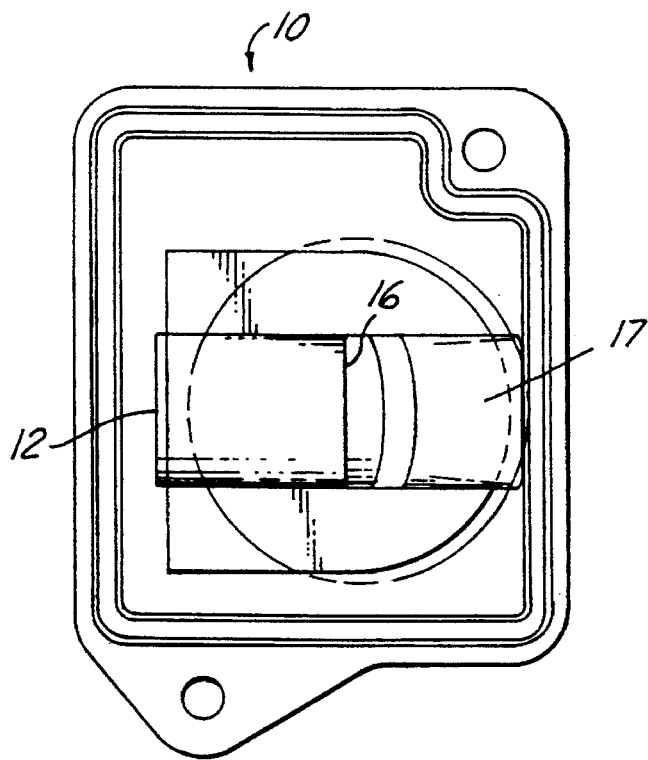
FIG.4

MASS AIR FLOW SENSOR HOUSING

BACKGROUND OF THE INVENTION

This invention relates to the measurement of air flow.

PRIOR ART

It is known to control internal combustion engines using electronic engine controls. Such electronic engine controls have inputs from various sensors such as a mass air flow sensor. It is know to position a mass air flow sensor in an air flow inlet to an internal combustion engine.

However, the direction of air flow in the air inlet is not always in the same direction. For example, although air usually flows into the engine, there are certain engine operating conditions when there is back flow of air in a direction away from the engine. Such back flow can produce undesirable indications of air flow and an incorrect air flow reading. It would be desirable to reduce such incorrect air flow readings.

It is also known to have mass air flow inlet housings with complex integral passageways so as to pass air through a bypass passageway, apart from the main passage, over an air flow sensor to measure air flow. For example, U.S. Pat. No. 4,393,697 entitled AIR FLOW RATE MEASURING APPARATUS teaches an air flow rate measuring apparatus having an air flow sensor and temperature sensor in a bypass passage for intake air formed in the vicinity of a main air flow guide chamber in an internal combustion engine. Air is taken into the bypass passage and is brought in at right angles back into the main passage. There is some protection against backflow in the bypass passage because the air is introduced at right angles into the main passage from the output of the bypass passage. It would be desirable to have a removable measuring air flow path which could be inserted into the main air flow path instead of requiring a complex mass air flow housing casting.

It is also known to have a configuration at the inlet to the bypass passages that includes an inlet surface defined by a radius and then a straight cylindrical bore. Such an inlet produces air flow turbulence which can affect the accuracy of the air flow measurement. It would be desirable to improve the flow characteristics of the entrance to this bypass passage. These are some of the problems this invention overcomes.

SUMMARY OF THE INVENTION

An embodiment of this invention increases measurement efficiency and reduces the effect of back flow on the measurement of air flow in an air flow measurement for an internal combustion engine through: 1) providing a converging elliptical inlet to the air flow measurement path, 2) positioning an inlet and an outlet of the air flow measurement path relatively close to one another in the direction of main air flow, 3) positioning a wedge shaped air deflector near the outlet of the air flow measurement path to provide a low pressure area adjacent the exit, and 4) providing a U-shaped air flow path with two parallel flow path chambers in the air flow measurement path. Such a configuration also produces an advantageously low noise ratio and high velocity across the mass air flow measurement sensor.

At the input to the bypass passage there is an elliptical shape to the inlet when viewed in cross section parallel to the main axis of the bypass passage. This elliptical configuration has two radiuses and is distinguished from the known single radius and straight line entrance. Such an elliptical entrance produces a cleaner air flow with less turbulence and conditions the air flow for a streamline approach to the hot wire element. This improves measurement sensitivity, stability and accuracy. Thus, the elliptical inlet improves the signal to noise ratio.

In accordance with an embodiment of this invention, a mass air flow meter uses a push and pull configuration for improved air flow. That is, there is a push in that there is a high pressure air at the inlet to the air measurement passage. Additionally, there is a pull because there is a wedge shaped deflector upstream of the outlet from the bypass passage to create a low pressure area which draws air out of the bypass passage.

More particularly, having a wedge shaped deflector near the outlet produces accelerated air flow adjacent the outlet without the need for reducing the cross sectional area of the main air flow path. The accelerated air flow produces a low pressure area which tends to pull air flow through the U-shaped flow path. Backflow of air into the outlet is also reduced by positioning the deflector upstream of the outlet.

Having an inlet and an outlet at relatively close proximity further reduces back flow by creating a similar pressure at the inlet and outlet of the U-shaped flow path. The U-shaped configuration of the bypass permits placing the inlet and the outlet closer to each other than would be possible in a straight line bypass or air flow measurement passage. By having the inlet and the outlet closer to each other, the bypass passage does not react to backflow as much because the air pressure acts the same on the inlet as on the outlet and thus produces no net effect. That is, this reduces the pressure differential between the bypass inlet and outlet which minimizes flow in the bypass when backflow occurs in the main bore.

The U-shaped path also produces a time lag due to increased volume which acts as a flow capacitor should any pressure differential or shearing forces cause flow to be drawn through the bypass. The combination of these effects produces no backflow through the bypass of the meter.

BRIEF DESCRIPTION OF THE DRAWINGS

FIG. 1 is a side view of a mass air flow sensor in accordance with an embodiment of this invention;

FIG. 2 is a top view of a mass air flow sensor in accordance with an embodiment of this invention;

FIG. 3 is a front view of a mass air flow sensor in accordance with an embodiment of this invention;

FIG. 4 is a bottom view of a mass air flow sensor in accordance with an embodiment of this invention;

DETAILED DESCRIPTION OF THE DISCLOSURE

Figure 5A:
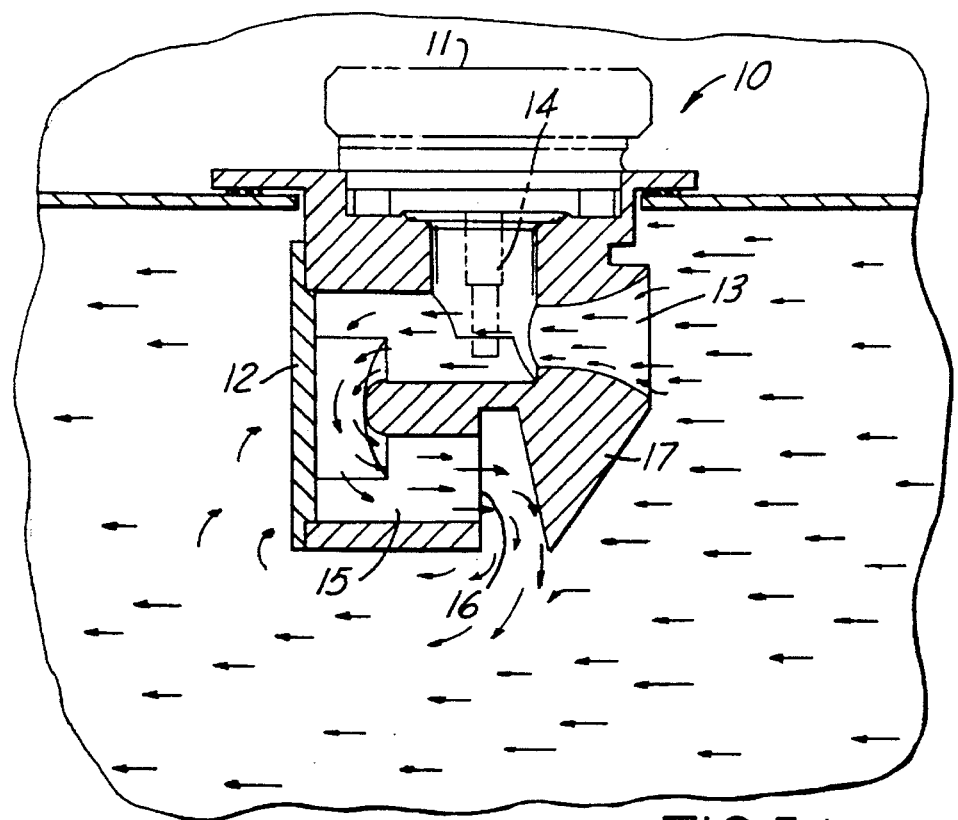
FIG. 5A is a cross sectional view (along section 5.5 of FIG. 3) of a mass air flow sensor in accordance with an embodiment of this invention in forward air flow.
Figure 5B:
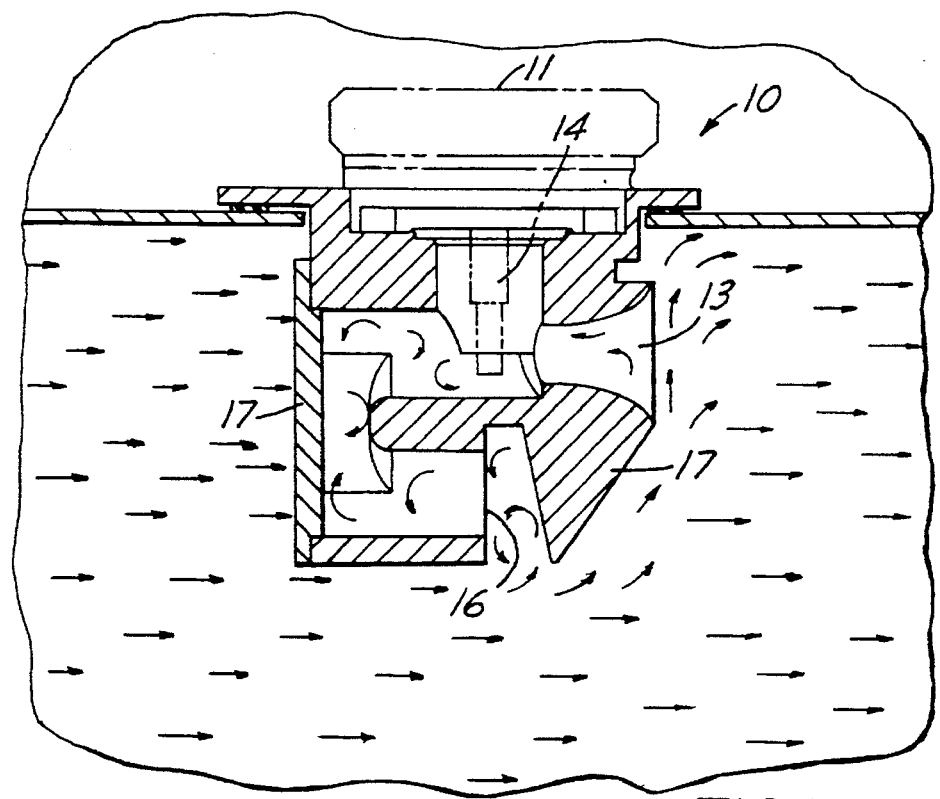
FIG. 5B is a cross sectional view (along section 5.5 of FIG. 3) of a mass air flow sensor in accordance with an embodiment of this invention in backward air flow.

Referring to FIG. 1, a mass air flow sensor 10 includes an electronic module 11 associated with a housing 12. Housing 12 is positioned in a main air flow path and includes an elliptical inlet, 13 for receiving forward air flow. Air flow within housing 12 follows a U-shaped path to an outlet 16. An air flow sensing element 14 is positioned in the path of the air flow in U-shaped path 15. Spaced upstream from outlet 16 is a wedge shaped deflector having an upstream surface angled with respect to air flow.

Converging elliptical inlet 13 increases air flow velocity across sensing element 14 and improves the signal to noise ratio of the output signal from sensing element 14 to electronic module 11. Inlet 13 and outlet 16 are in relatively close proximity along an axis parallel to the main air flow so as to reduce back flow by creating similar air pressures both at inlet 13 and exit 16. Wedge shaped deflector 17 near outlet 16 produces accelerated flow by outlet 16 without a reduction in the cross sectional area of the main air flow path.

The angle of the upstream surface of deflector 17 with respect to the direction of main air flow is such as to create an advantageously low pressure area adjacent outlet 16 so as to promote air flow through U-shaped path 15. If the upstream surface deflector 17 is too parallel with the main air flow, not enough low pressure is created. If the upstream surface of deflector 17 is too perpendicular to the main air flow, too much air turbulence is created without an advantageously low pressure area.

The air flow through the meter enters inlet 13 and accelerates through a converging inlet section and passes over sensing element 14. At the same time, flow that did not enter the bypass passes over wedge deflector 17. This flow accelerates around the end of wedge deflector 17 and creates a low pressure at bypass outlet 16. The low pressure accelerates the flow through the bypass as it makes two one hundred and eighty degree turns before reentering the main bore flow (see FIG. 5A)

Mass air flow sensor 10 provides control of noise, air flow velocity and backflow. For low noise, the converging elliptical inlet is used to condition the flow prior to passing over the elements to reduce the turbulence. For high velocity, the converging inlet produces a smaller diameter air flow passage near the element which increases the flow velocity across sensing element 14. The flow is also accelerated using the wedge shaped geometry 17 under inlet 13 to produce a low pressure at outlet 16 of sensor 10. This low pressure accelerates the flow through the bypass producing a faster velocity than the main bore. Protection from backflow is achieved by forcing air flow into a 180 degree turn and allowing the bypass tube to act as a flow capacitor to dampen out the effects of backflow. That is, the volume of U-shaped path 15 is of sufficient magnitude so that path 15 can act as an air flow capacitance. In reverse flow, there is very little pressure difference between inlet 13 and outlet 16 of the bypass, thus causing no flow to traverse the bypass when reverse flow goes through the main bore.

Various modifications and variations will no doubt occur to those skilled in the arts to which this invention pertains. Such variations which basically rely on the teachings through which this disclosure has advanced the art are properly considered within the scope of this invention.

We claim:

1. A mass air flow sensor housing for reducing back flow includes:

a housing body for providing a generally U-shaped air flow path within the body for air flow measurement;

an inlet to the U-shaped path for receiving forward air flow, said inlet having a longitudinally converging elliptical configuration;

an outlet from the U-shaped path opening towards said inlet; and a generally wedge shaped deflector adjacent an upstream end of the outlet to deflect forward flow air away from the outlet and shield the outlet from forward air flow.

2. A mass air flow sensor housing as recited in claim 1 wherein said outlet from the U-shaped path is advantageously proximate to the inlet to the U-shaped path, in a direction parallel to main air flow, so that the inlet and the outlet experience about the same air pressure in the main air flow path during backflow conditions thereby reducing any pressure differential between the outlet and the inlet and reducing backflow in the air measurement passage.

3. A mass air flow sensor housing as recited in claim 2 wherein said longitudinally converging ellipse inlet is such as to provide reduced turbulence in the air flow thus improving measurement of mass air flow.

4. A mass air flow sensor housing as recited in claim 3 wherein said wedge shaped deflector has an upstream surface angled with respect to the main air flow so as to produce a low pressure area near the outlet thus promoting air passage to the U-shaped bypass path.

5. A mass air flow sensor housing as recited in claim 4 wherein said U-shaped path has a volume of sufficient magnitude so as to act as an air flow capacitance to dampen out any back flow.

6. A mass air flow sensor housing for use in a main air flow path and for reducing back flow includes:

a housing body for providing a generally U-shaped air flow path within the body for air flow measurement;

an inlet to the U-shaped path for receiving forward air flow, said inlet having a longitudinally converging elliptical configuration so as to provide reduced turbulence in the air flow thus improving measurement of mass air flow, and having a volume of sufficient magnitude so as to act as an air flow capacitance to dampen out any back flow;

an outlet from the U-shaped path; said outlet from the U-shaped path opening towards said inlet being advantageously proximate to the inlet to the U-shaped path, in a direction parallel to main air flow, so that the inlet and the outlet experience about the same air pressure in the main air flow path during backflow conditions thereby reducing any pressure differential between the outlet and the inlet and reducing backflow in the air measurement passage; and a generally wedge shaped deflector adjacent an upstream end of the outlet to deflect forward flow air away from the outlet and shield the outlet from forward air flow; said wedge shaped deflector having an upstream surface angled with respect to the main air flow so as to produce a low pressure area near the outlet thus promoting air passage to the U-shaped bypass path.

* * * * *